US009079656B2

(12) United States Patent  (10) Patent No.: US 9,079,656 B2
Korenaga et al.  (45) Date of Patent: Jul. 14, 2015

(54) MISTAKE RESISTANT DESIGN FOR WING FUEL TANK ACCESS DOOR ALIGNMENT FEATURES

(71) Applicant: The Boeing Company, Chicago, IL (US)

(72) Inventors: Brian H. Korenaga, Shoreline, WA (US); Mark S. Novak, Seattle, WA (US)

(73) Assignee: The Boeing Company, Chicago, IL (US)

(*) Notice: Subject to any disclaimer, the term of this patent is extended or adjusted under 35 U.S.C. 154(b) by 333 days.

(21) Appl. No.: 13/767,005

(22) Filed: Feb. 14, 2013

(65) Prior Publication Data

US 2014/0223829 A1    Aug. 14, 2014

(51) Int. Cl.
*B64C 1/14*    (2006.01)
(52) U.S. Cl.
CPC ............. *B64C 1/1461* (2013.01); *B64C 1/1446* (2013.01)
(58) Field of Classification Search
CPC ...... B64C 1/14; B64C 1/1407; B64C 1/1446; B64C 1/1461
See application file for complete search history.

(56) References Cited

U.S. PATENT DOCUMENTS

| 2,302,740 | A | * | 11/1942 | Boicey | 52/204.52 |
| 2,480,692 | A | * | 8/1949 | Anthony | 244/129.4 |
| 4,291,816 | A | | 9/1981 | Lamoureux | |
| 4,530,443 | A | | 7/1985 | Gorges | |
| 4,579,248 | A | | 4/1986 | Gorges | |
| 4,848,034 | A | | 7/1989 | Pace | |
| 8,141,820 | B2 | | 3/2012 | Zuniga | |
| 8,662,451 | B2 | * | 3/2014 | Delgado | 244/129.4 |
| 2012/0187247 | A1 | | 7/2012 | Delgado | |
| 2013/0180176 | A1 | | 7/2013 | Tachibana | |

FOREIGN PATENT DOCUMENTS

EP    2535265 A1    12/2012

* cited by examiner

*Primary Examiner* — Philip J Bonzell
(74) *Attorney, Agent, or Firm* — Felix L. Fischer

(57) ABSTRACT

An access door structure for a wing skin is received in an access hole opening which incorporates a protective glove having a set of mistake resisting features and engaging the periphery of the access hole opening. An inner door seals an interior of the access hole opening and has multiple fastener attachment elements and a set of mating mistake resisting features. An outer door engaged over an exterior of the access hole opening has fastener holes for mating alignment with the fastener attachment elements and receives a plurality of fasteners for engagement of the inner and outer doors.

21 Claims, 12 Drawing Sheets

MISTAKE RESISTANT DESIGN FOR WING FUEL TANK ACCESS DOOR ALIGNMENT FEATURES

REFERENCE TO RELATED APPLICATIONS

This application is copending with application Ser. No. 12/606,331 filed on Oct. 27, 2009 entitled Composite Access Door having a common assignee with the present application.

BACKGROUND INFORMATION

1. Field

Embodiments of the disclosure relate generally to the field of mating systems for structural access doors and more particularly to a system for alignment and providing mistake resistance for fuel tank access doors with features for pressure distribution to avoid tank seal breech.

2. Background

Structural access doors in large commercial aircraft are required to provide ingress and egress from various compartments such as wing fuel tanks for maintenance and inspection requirements. The doors are typically designed with fastener systems (with self-retained nuts) and have minimal surface protrusion on the outer surface to provide aerodynamic smoothness for the door surface. In large aircraft a significant number of wing access doors are present, many with similar or identical size and planform. These wing access doors are designed to differing strengths depending on where on the wing the door is placed. For instance doors near the landing gear tires must withstand large pieces of rubber and debris that can collide with the door after tire failure. Doors that are further way from the tires do not need to be as strong and so a lighter and, consequently, weaker door is made. To assure that certain doors are not installed at incorrect locations, some type of physical mistake resistance is required. This insures that the medium or light doors are not used in areas where heavier doors are required. In certain prior art systems radial blade and slot engagement of mistake resistance features has been employed.

Additionally, aircraft are susceptible to electrical discharges due to static or other natural phenomena, particularly with respect to wing fuel tank access doors, control or diversion of the energy from electrical discharges is required. In prior art aircraft having metallic structure, conductive paths provided by the structure itself typically rendered sufficient protection. However, with greater reliance on composite structural materials which are generally less conductive than metals typically used in commercial aerospace, alternative design methods are required. One embodiment of a prior art door design for use in carbon fiber reinforced plastic (CFRP) structures employed a conductive clamp ring mounted against a conductive door surface to allow currents to flow across the door and wing surface. In advanced aircraft designs, use of CFRP for greater portions of the structural content of the aircraft is desired for further weight reduction. A change from metal to CFRP as the primary access door material and removing the clamp ring from the design is there for desirable. Not having a continuous conductive path between a door retention fastener to the door surface to the wing skin may lead to an electrical discharge. This may result in expanding gas in the volume between the inner/outer doors and the access hole wing skin cutout ("racetrack").

It is therefore desirable to provide access door interface designs for (CFRP) structures which provide the desired mistake resistance and avoid impeding any expanding gas in the racetrack thereby preventing redirection of the gas with possible seal breech into the fuel tank.

SUMMARY

Embodiments disclosed herein provide an access door structure for a wing skin having an access hole opening which incorporates a protective glove engaging the periphery of the access hole and having a set of mistake resisting features. An inner door seals an interior of the access hole opening and has multiple fastener attachment elements and a set of mating mistake resisting features. An outer door engaged over an exterior of the access hole opening has fastener holes for mating alignment with the fastener attachment elements and receives a plurality of fasteners for engagement of the inner and outer doors.

In one example, a composite fuel tank door assembly employs an outer access door received over an access hole in a wing skin. An inner access door has a channel housing fastener attachment elements. Multiple securing fasteners extend through the outer access door to be received in the fastener attachment elements in the inner access door to securely seal the access door assembly at a periphery of the access hole opening. At least one mistake resisting feature extends from a wall of the access hole opening into the channel. At least one mating mistake resisting feature extends from a surface of the inner access door into the channel for operative engagement of the at least one mistake resisting feature in a singular configuration. The mistake resisting feature and mating mistake resisting feature provide clearance in the channel for any gas or shockwave progression.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide a structural access door configuration in which mistake-resisting features are provided to prevent an access door from being installed in non-designated locations. Shape and installation profiles of the mistake-resisting features within a channel forming the racetrack prevents expanding gases from being directed towards the seal between the fuel access door and wing fuel tank.

Figure 1:
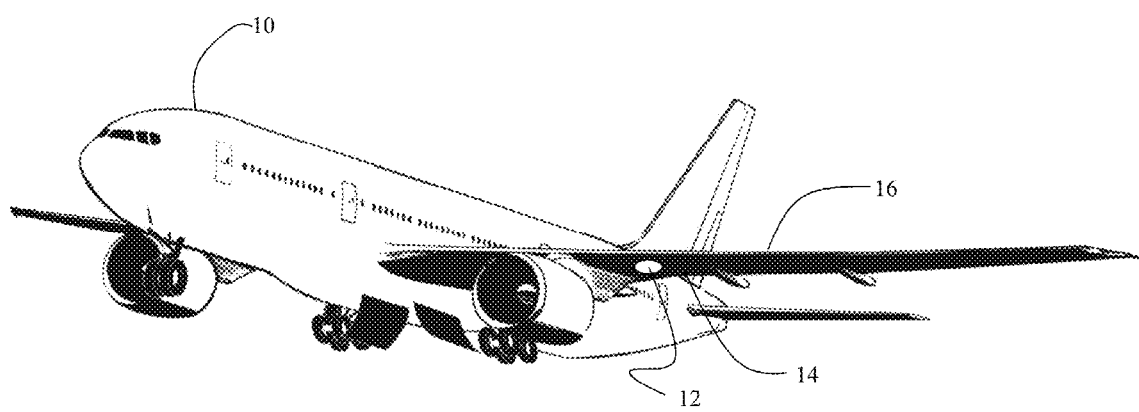
FIG. 1 is a pictorial view of an aircraft showing an example under-wing access door location.
Figure 2:
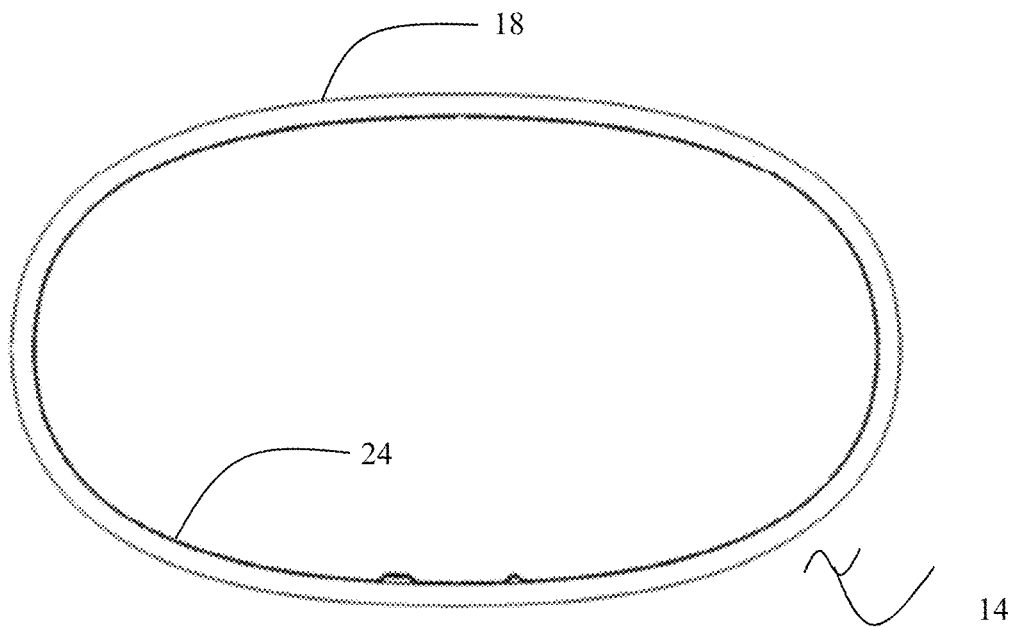
FIG. 2 is a bottom view of an access hole opening in the wing skin.
Figure 3:
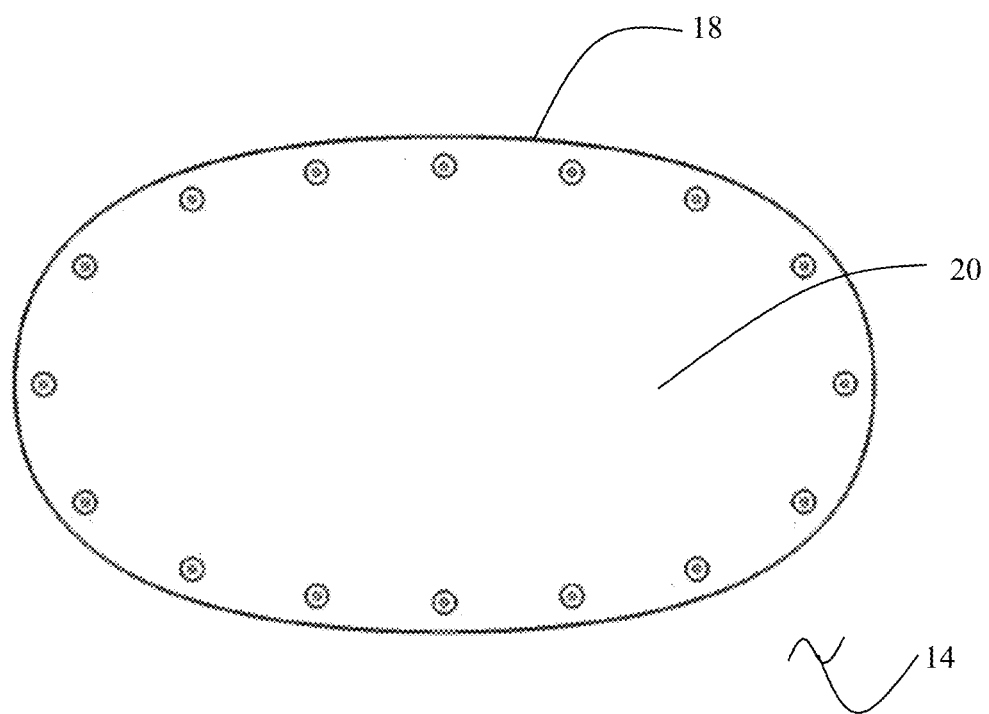
FIG. 3 is a bottom view of an outer access door as installed.
Figure 4:
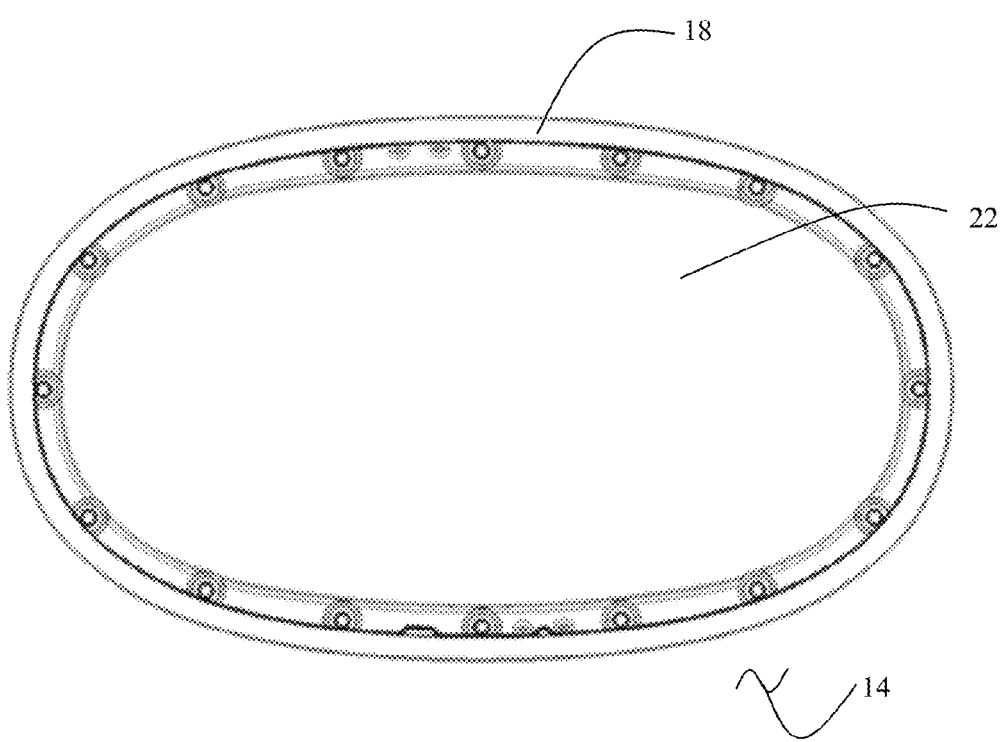
FIG. 4 is a bottom view of an inner access door with the outer access door omitted.

Referring to the drawings, FIG. 1 shows an aircraft 10 having a structural access door assembly 12 located in a bottom skin 14 of a wing 16. For the embodiment shown the aircraft structure and wing skin as well as the structural access door assembly are primarily fabricated from CFRP or other composite materials. The location shown may be one of multiple substantially identically shaped access doors in the wings of the aircraft. As shown in FIG. 2, the wing skin 14 incorporates an access hole 18 in which a protective glove 24 is installed. For the exemplary embodiment shown, the access door assembly 12 includes an outer door 20 shown installed in the access hole 18 in FIG. 3 and an inner door 22 shown installed in the access hole 18 with the outer door removed in FIG. 4. For tooling consistency in manufacturing it is desirable for multiple doors to have substantially identical elliptical dimensions with minimum hole size to accommodate the average airline mechanic. However to help prevent miss-installation of similarly sized doors in the wrong locations mistake resistance is required.

Figure 5:
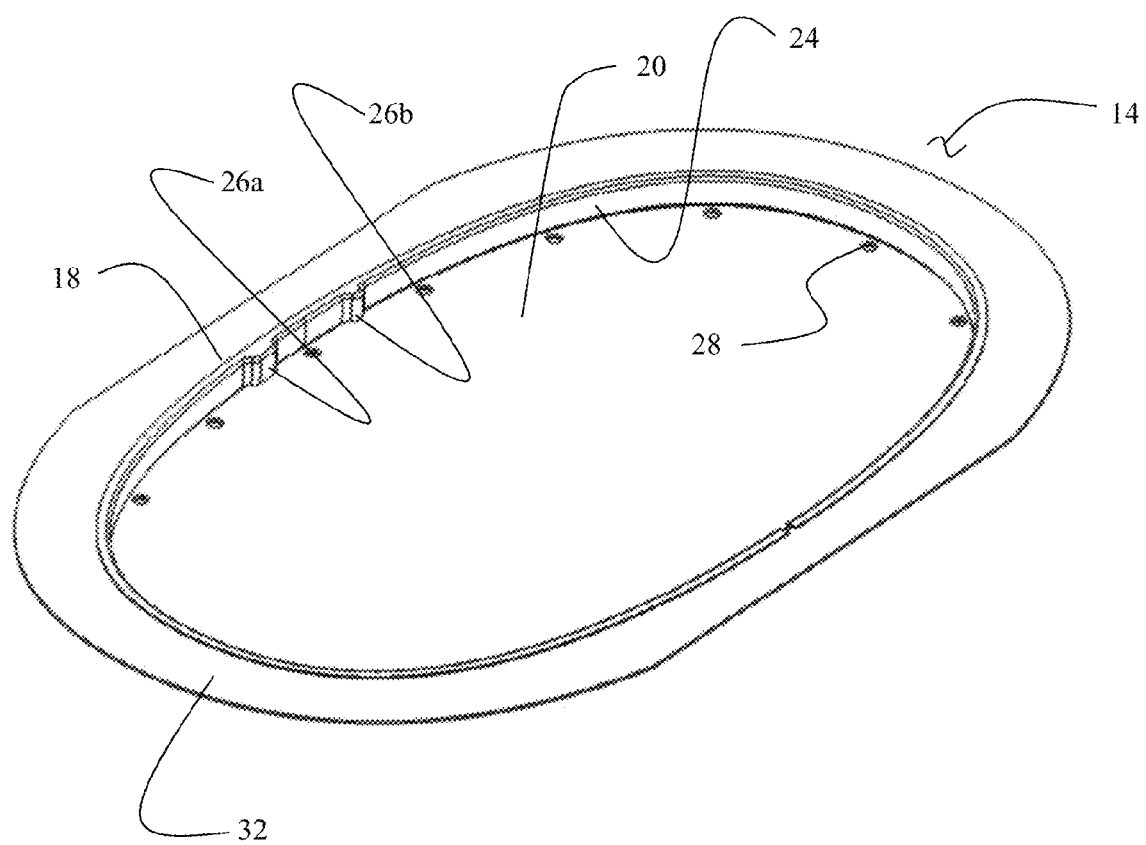
FIG. 5 is an upper pictorial view of an access hole opening with the protective glove installed on the periphery of the hole and outer access door in place with the inner access door omitted.
Figure 6:
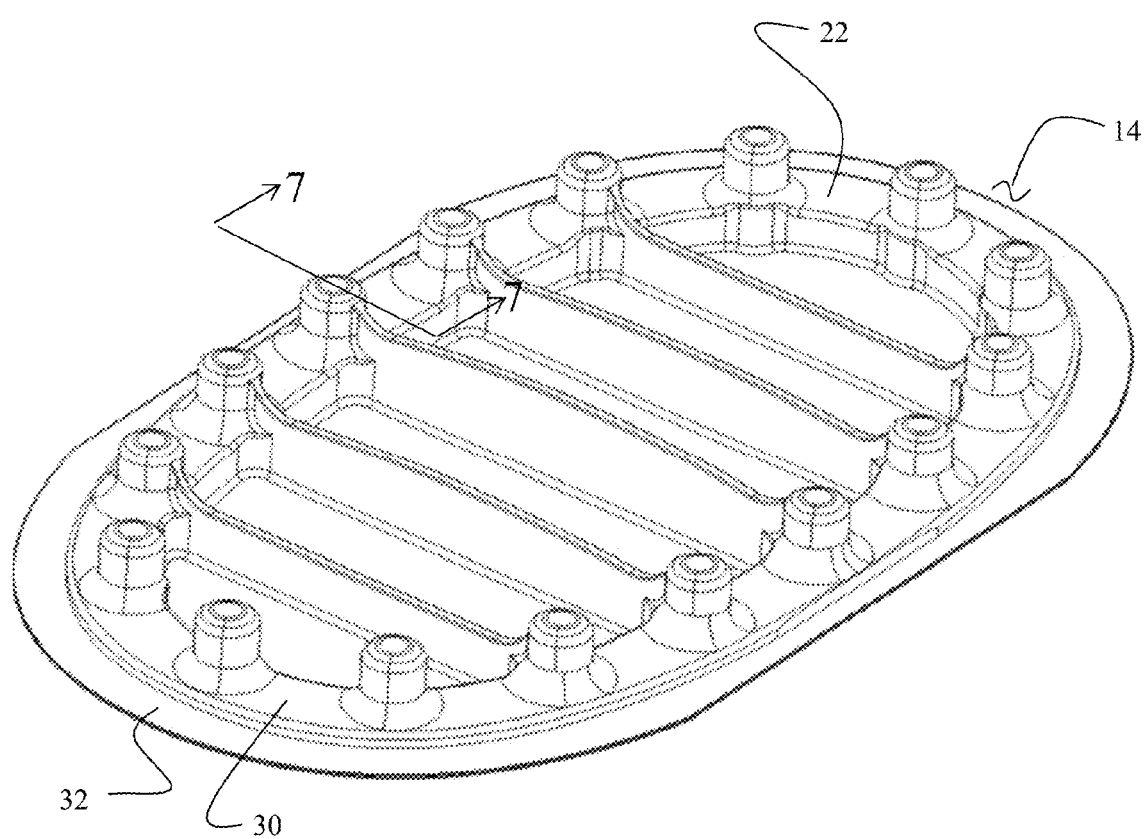
FIG. 6 is an upper pictorial view of the access door with the inner access door installed.

A protective glove 24 is installed around the periphery of access hole 18 as seen in FIG. 5. The glove 24 includes, as mistake resisting features, bumps 26a and 26b, the function of which will be described in greater detail subsequently. A spacer 32 (to be described in greater detail subsequently) surrounds the access hole 18. Outer door 20 incorporates multiple fastener holes 28 and in certain embodiments may employ a copper foil or other conductive sheathing. Inner door 22, shown in FIG. 6 includes a sealing flange 30 which is received over the spacer 32. As shown in the section view of FIG. 7, outer door 20 is received in a chamfer 34 in the wing skin 14. Fasteners 36 received through the fastener holes 28 in the outer door extend into mating contact with threaded inserts 38 installed in domes 40 formed in the inner door. Sealing flange 30, extending over the spacer 32 and wing skin 14 surrounding access hole 18, incorporates a fuel seal 42 for sealing the wing tank volume 44 with the assembled inner door 22 and outer door 20. The sealing flange 30 terminates in a wall 46 that creates a channel 48 with the periphery of access hole 18 having a width 58 to provide space for the fasteners 36.

Figure 8:
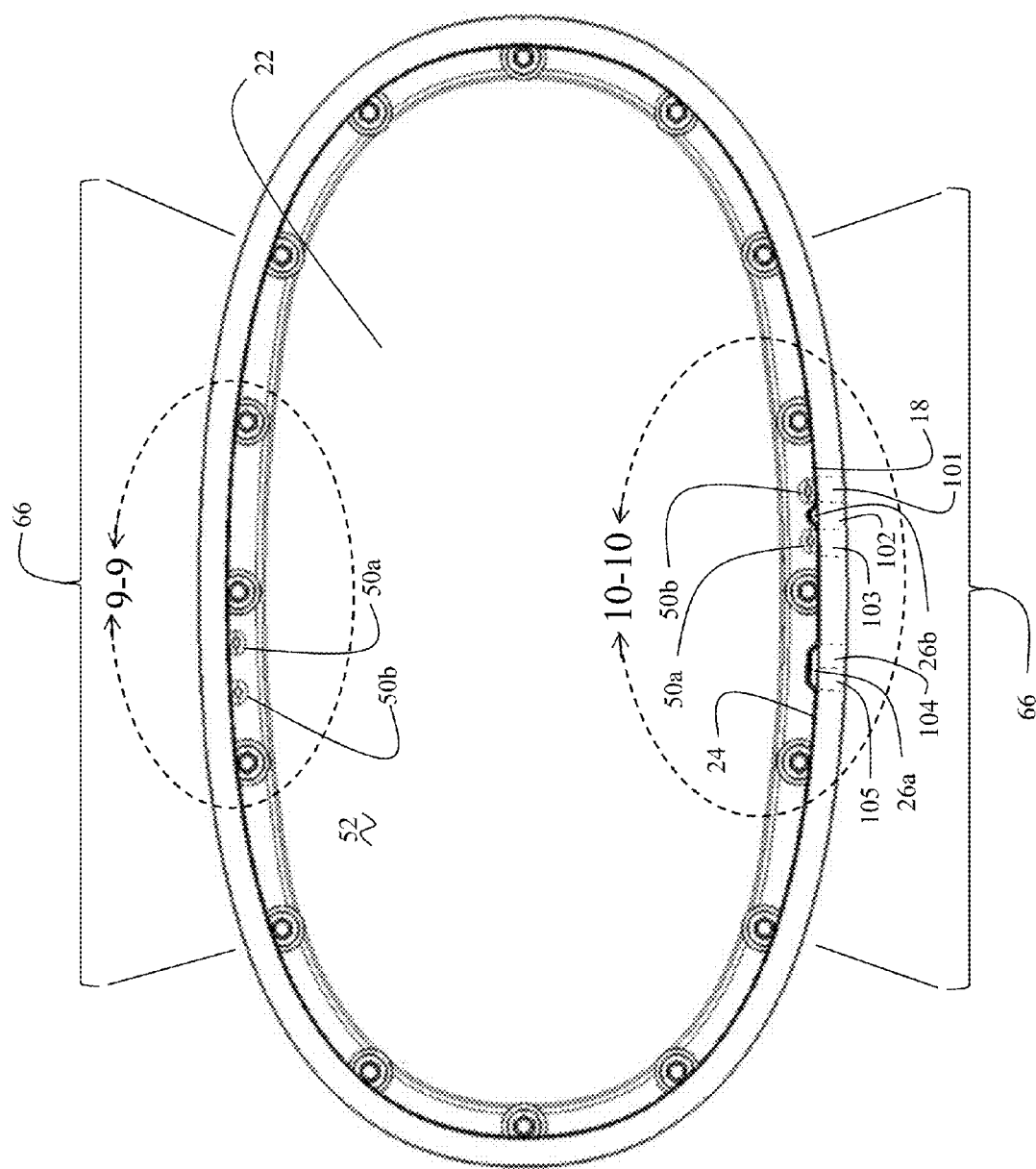
FIG. 8 is a bottom view of an access hole opening with the outer access door removed and the inner access door in place.
Figure 9:
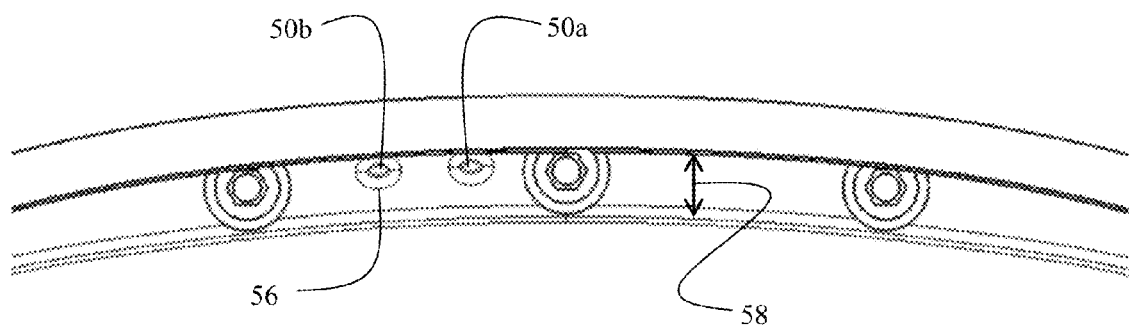
FIG. 9 is a detailed view of a portion of the access door periphery in bubble 9-9 of FIG. 8.
Figure 10:
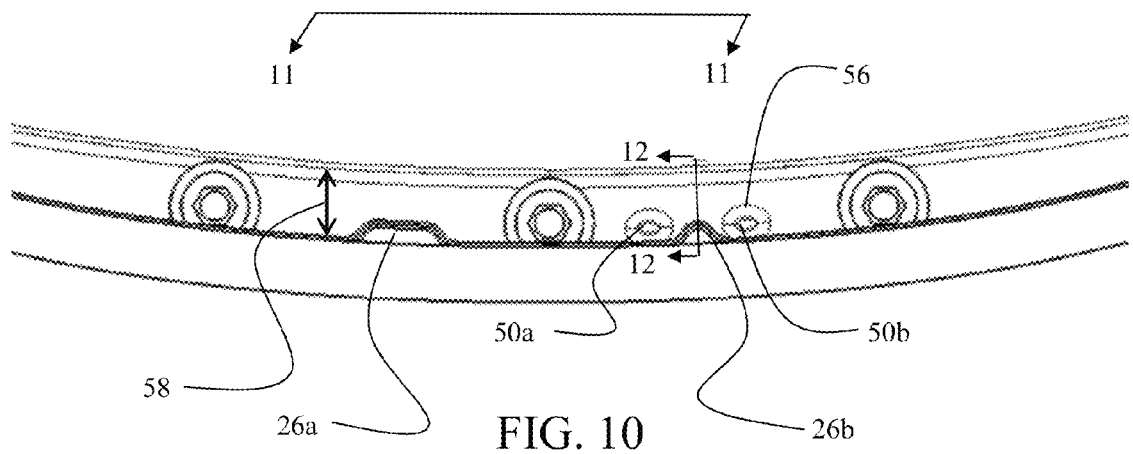
FIG. 10 is a detailed view of a portion of the access door periphery in bubble 10-10 of FIG. 8.
Figure 11:
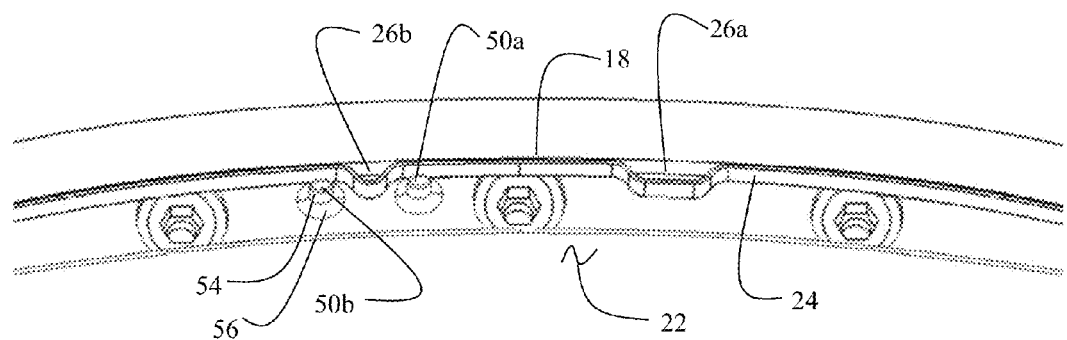
FIG. 11 is a detailed pictorial view of the portion of the access door periphery designated by line 11-11 in FIG. 10.

FIG. 8 demonstrates an example of the mistake resistance employed in the present embodiments for installation of the door assembly 12 into the access hole 18. Installation fit is provided by a combination of bumps (26a, 26b for the glove configuration shown) on the protective glove 24 and posts (50a, 50b for the door assembly shown) extending from an exterior surface 52 of the inner door 22. Inner door 22 is symmetrical about the longitudinal axis with two sets of posts 50a and 50b located on the door adjacent the curvature of protective glove 24 on the periphery of access hole 18 allowing proper placement of the door at either of two 180° orientations.

Details of the mistake resisting interface are shown in FIGS. 9 through 12. Bumps 26a and 26b extending from the protective glove 24 will only allow positioning of an inner door 22 having posts spaced and circumferentially located to be received around one or more of the bumps; in the instance shown, bump 26b received between posts 50a and 50b. As shown in FIG. 13, a matrix of bump and post positions 60 along a specifically defined length of the circumference of the glove and door creates assured interference between the posts and bumps except for the specific mating pairing. For the example shown, five positions 60 are defined with respect to door type 62. Position 1 is shown in FIG. 8 as element 101, position 2 as 102, position 3 as 103, position 4 as 104 and position 5 as 105. For a first door type, impact heavy, position 1 is occupied by a post on the inner door. Positions 2-4 are occupied by bumps on the glove. Position 5 is occupied by a post on the inner door. A second door type, impact, has position 1 occupied by a bump on the glove, position 2 by a post extending from the inner door, positions 3 and 4 occupied by a bump on the glove and position 5 by a post extending from the inner door. As seen from these first two door types, an "impact" door could not be inserted in a "impact heavy" access hole since the pin in position 2 of the impact door would interfere with the bumps on the glove extending over position two of the impact heavy access hole preventing installation. Similarly for each door type, at least one post (or in limited cases an installation fastener) from an alternate door type would impact a bump location inhibiting installation.

As shown in the matrix of FIG. 13, the five position definition with two posts extending from each inner door allows ten door types with assured mistake resistance. In a general case, the matrix incorporates positions for n door types with p positions and z posts and p-z bumps. Bump locations at adjacent positions may result in a "merged bump" extending over the multiple locations as opposed to individual bumps at each location. The door assembly embodiment shown in FIGS. 9-12 corresponds to a "Mid-Extra Heavy" door type with posts at positions 1 and 3, a single bump at position 2 intermediate the posts and a merged bump at positions 4 and 5.

As seen in FIGS. 9-12, posts 50a and 50b are elliptical in planform having a major axis perpendicular to the cross sectional area of the channel 48. For each post, a post body 54 expands into a filleted base 56 providing stress and aerodynamic smoothness within the channel. For the embodiment shown, the geometric shape and positioning of the mistake resisting features are provided to specifically accommodate gas expansion in the channel due to electrical discharge or other environmental effects. The rounded geometries avoid deflection of the expanding gases towards the seal between the inner door and fuel tank skin. Additionally, sizing of the posts is less than the diameter of the fasteners 36 for the embodiments shown. Bumps 26a and 26b extend into channel 48 to occlude less than 25% of a width 58 of the channel avoiding any impedance to gas expansion within the channel 48.

Figure 7:
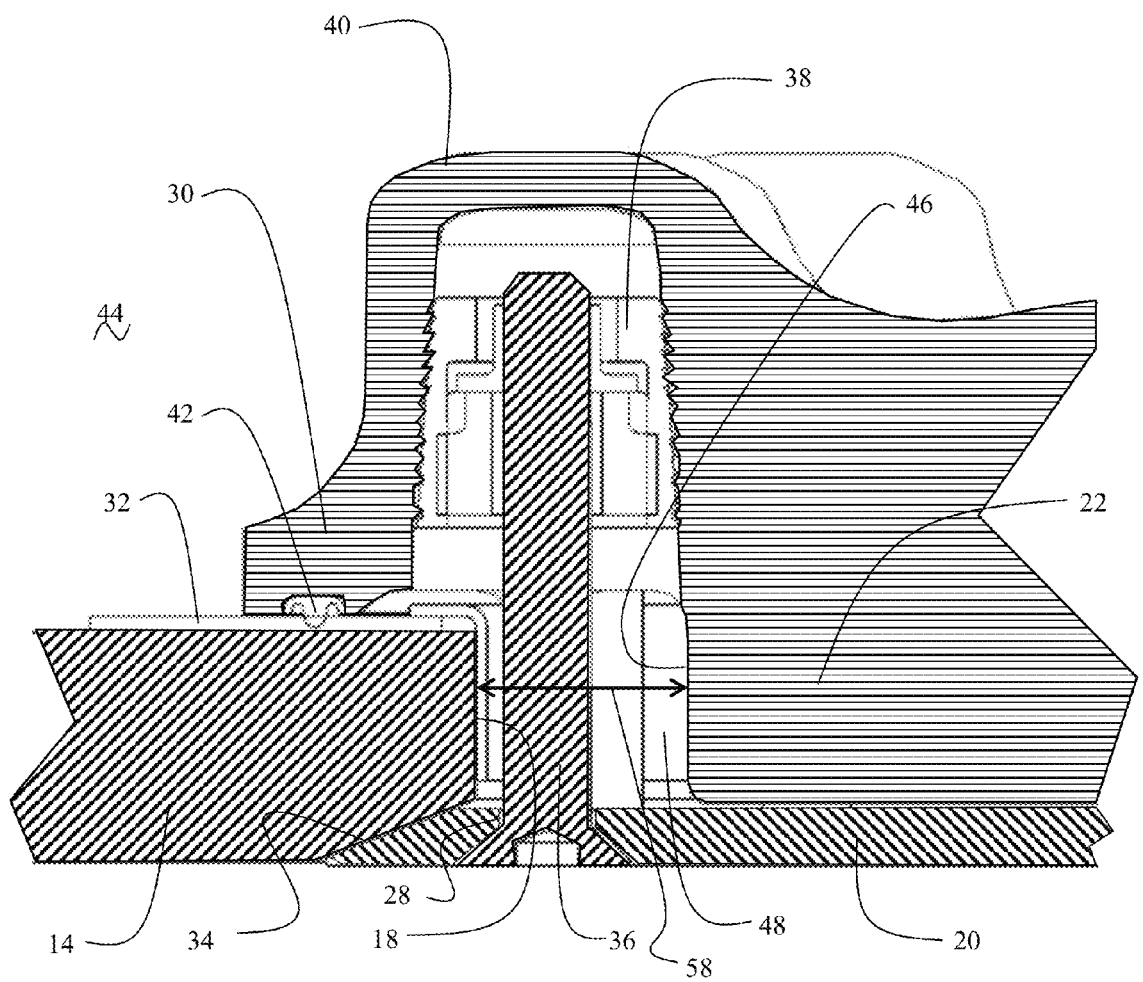
FIG. 7 is a section view of both an inner and outer access installed in an access hole opening.
Figure 12:
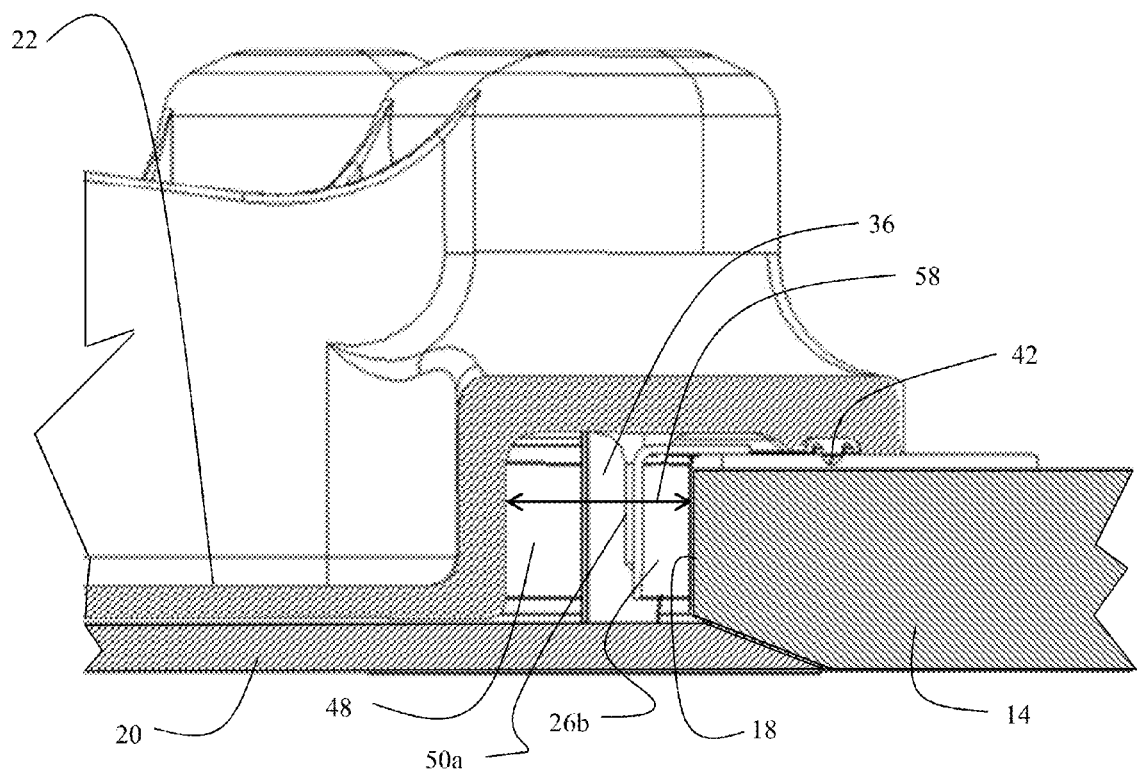
FIG. 12 is a detailed section view along line 12-12 of FIG. 10.
Figure 13:
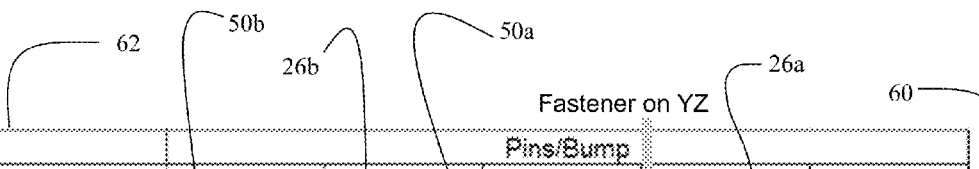
FIG. 13 is a table showing mistake resisting glove and pin location for multiple door types.
Figure 14:
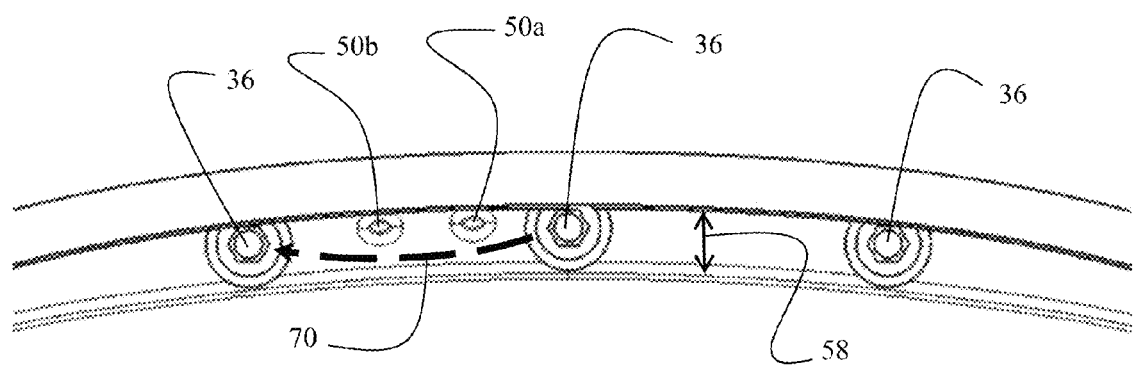
FIG. 14 is the detailed view of FIG. 9 showing exemplary flow within the racetrack.
Figure 15:
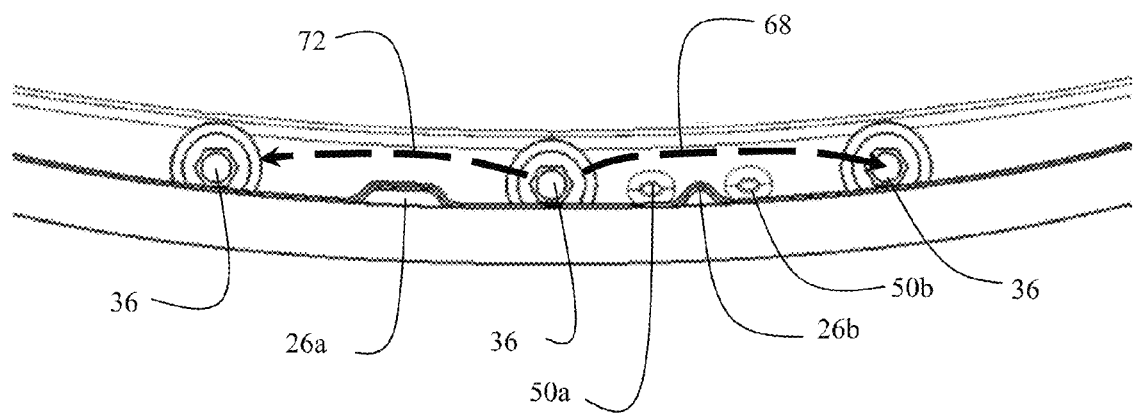
FIG. 15 is the detailed view of FIG. 10 showing exemplary flow within the racetrack; and, FIG. 16 is a flow chart of a method for providing mistake resisting features for access door assemblies.

As shown in FIGS. 14 and 15, the minimal intrusion of the bumps into the channel and reduced profile of the posts prevents blockage in the channel which might divert expanding gases, shown notionally as arrows 68, 70 and 72, toward the seal 42 (seen in FIGS. 7 and 12). Additionally, placement of the mistake resisting positions on the larger radius portions 66 of the elliptical shape substantially centered on the minor axis (as shown in FIG. 8), reduces any flow turning resistance induced by the shape of the channel which might be exacerbated by the mistake resisting features.

Figure 16:
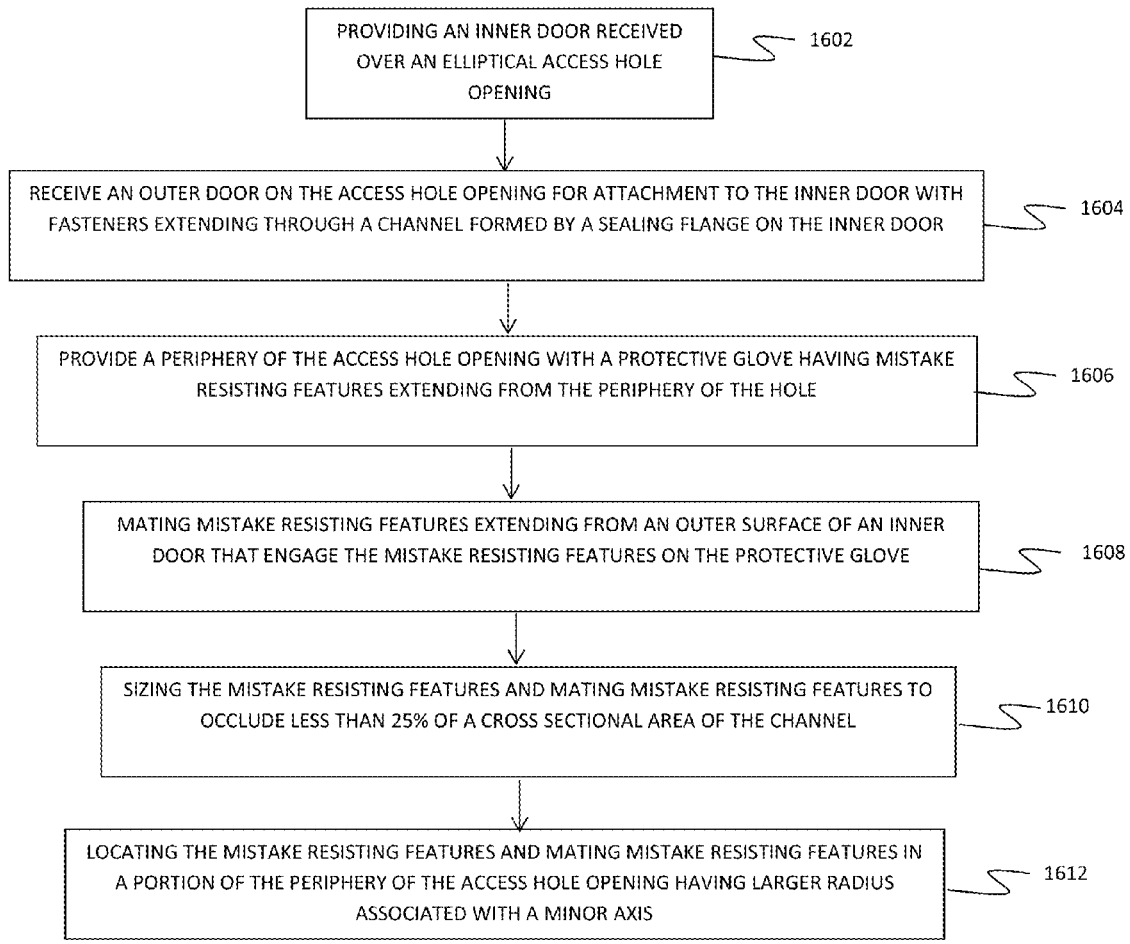

The embodiments disclosed provide a method for mistake resistant installation of composite access door structures with minimal impedance of gas expansion in the racetrack as shown in FIG. 16 by providing an inner door received over an elliptical access hole opening, step 1602. An outer door is received on the access hole opening for attachment to the inner door with fasteners extending through a channel formed by a sealing flange on the inner door, step 1604. A periphery of the access hole opening is provided with a protective glove having mistake resisting features extending from the periphery of the hole, step 1606. Mating mistake resisting features extending from an outer surface of an inner door that engage the mistake resisting features on the protective glove, step 1608. The mistake resisting features and mating mistake resisting features are sized to occlude less than 25% of a cross sectional area of the channel, step 1610 and may be located in a portion of the periphery of the access hole opening having larger radius associated with a minor axis, step 1612.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. An access door structure comprising:
   a wing skin having an access hole opening;
   a protective glove engaging the periphery of the access hole opening and having a set of mistake resisting features;
   an inner door sealing an interior of the access hole opening and having a plurality of fastener attachment elements and a set of mating mistake resisting features;
   and an outer door engaged over an exterior of the access hole opening having a plurality of fastener holes for mating alignment with the fastener attachment elements and receiving a plurality of fasteners for engagement of the inner and outer door.

2. The access door structure of claim 1 wherein the inner door includes a sealing flange extending over an interior surface of the wing skin adjacent the access hole opening, said flange terminating in a wall creating a channel with the protective glove, the fasteners extending through the channel.

3. The access door structure of claim 2 further comprising a sealing spacer intermediate the wing skin and the access door sealing flange.

4. The access door structure of claim 3 wherein the sealing flange engages a fuel seal against the sealing spacer for sealing a tank volume.

5. The access door structure of claim 2 wherein the set of mistake resisting features comprises a plurality of bumps extending from the protective glove at designated locations and the set of mating mistake resisting features comprises a plurality of posts extending from the sealing flange of the inner door into the channel.

6. The access door structure of claim 5 wherein the plurality of bumps and plurality of posts occlude no more than 25% of a width of the channel.

7. The access door structure of claim 5 wherein the access hole opening is substantially elliptical and the plurality of bumps and plurality of posts are positioned on a portion of the access hole opening having a larger radius corresponding to the minor axis of said access hole opening.

8. The access door structure of claim 5 wherein the posts are elliptical in planform with a major axis perpendicular to a cross sectional area of the channel.

9. The access door structure of claim 5 wherein the bumps and posts are located by a matrix of a plurality of positions extending along a portion of the access hole opening, said matrix defining interfering positions of posts and bumps for a distinct mating arrangement on each matched interior door and access hole opening.

10. The access door structure of claim 9 wherein the matrix incorporates positions for n door types with p positions and z posts and p-z bumps.

11. A composite fuel tank door assembly with mistake resistance comprising:
    an outer access door received over an access hole opening in a wing skin;
    an inner access door having a channel housing a plurality of fastener attachment elements;
    a plurality of securing fasteners extending through said outer access door to be received in said fastener attachment elements to sealingly secure said outer access door and said inner access door at a periphery of said access hole opening;
    at least one protective glove mistake resisting feature extending from a wall of said access hole opening into the channel;
    and at least one mating mistake resisting feature extending from an outer surface of said inner access door into said channel for operative engagement of the at least one protective glove mistake resisting feature in a singular configuration, said mistake resisting feature and mating mistake resisting feature providing clearance in said channel for gas expansion and shockwave propagation.

12. The composite fuel tank door assembly as defined in claim 11 further comprising a protective glove engaging a periphery of the access hole opening and incorporating the at least one mistake resisting feature.

13. The composite fuel tank door assembly as defined in claim 12 wherein the inner door includes a sealing flange extending over an interior surface of the wing skin adjacent the access hole opening, said flange terminating in a wall creating a channel in combination with the protective glove, said fasteners extending through the channel.

14. The composite fuel tank door assembly as defined in claim 13 further comprising a sealing spacer intermediate the wing skin and the sealing flange.

15. The composite fuel tank door assembly as defined in claim 14 wherein the sealing flange engages a fuel seal against the sealing spacer for sealing a tank volume.

16. The composite fuel tank door assembly as defined in claim 12 wherein the at least one mistake resisting feature comprises a plurality of bumps extending from the protective glove at designated locations and the set of mating mistake resisting features comprises a plurality of posts extending from the sealing flange of the inner door into the channel.

17. The composite fuel tank door assembly as defined in claim 16 wherein the posts are elliptical in planform with a major axis perpendicular to a cross sectional area of the channel.

18. The composite fuel tank door assembly as defined in claim 16 wherein the plurality of bumps and plurality of posts occlude no more than 25% of a width of the channel.

19. The composite fuel tank door assembly as defined in claim 18 wherein the access hole opening is substantially elliptical and the plurality of bumps and plurality of posts are positioned on a portion of the protective glove having a larger radius corresponding to the minor axis of the access hole opening.

20. A method for providing mistake resistance to an access door assembly comprising:

providing an inner door received over an elliptical access hole opening;

receiving an outer door on the access hole opening for attachment to the inner door with fasteners extending through a channel formed by a sealing flange on the inner door;

providing on a periphery of the access hole opening a protective glove having mistake resisting features extending from the periphery of the opening;

engaging mating mistake resisting features extending from an outer surface of an inner door with the mistake resisting features on the protective glove;

and sizing the mistake resisting features and mating mistake resisting features to occlude less than 25% of a cross sectional area of the channel.

21. The method as defined in claim 20 further comprising locating the mistake resisting features and mating mistake resisting features in a portion of the periphery of the access hole opening having larger radius associated with a minor axis.

* * * * *